United States Patent [19]

Wong

[11] Patent Number: 5,680,273
[45] Date of Patent: Oct. 21, 1997

[54] METHOD AND APPARATUS EMPLOYING SYSTEM FOR RECIRCULATING LIQUID IN A CONTROLLED ENVIROMENT

[75] Inventor: Walter Wong, Boulder, Colo.

[73] Assignee: Seagate Technology, Inc., Scotts Valley, Calif.

[21] Appl. No.: 626,917

[22] Filed: Apr. 3, 1996

Related U.S. Application Data

[63] Continuation of Ser. No. 395,635, Feb. 28, 1995, abandoned, which is a continuation of Ser. No. 976,216, Nov. 13, 1992, abandoned.

[51] Int. Cl.[6] .................................. G11B 33/14; G11B 5/60
[52] U.S. Cl. .................................. 360/97.02; 360/103
[58] Field of Search .................................. 360/97.01, 97.02, 360/98.02, 102, 103; 369/258, 275.5; 428/694 TP, 694 BP, 695, 900

[56] References Cited

U.S. PATENT DOCUMENTS

| | | | |
|---|---|---|---|
| 4,327,139 | 4/1982 | Schaefer et al. | 428/695 |
| 4,626,941 | 12/1986 | Sawada et al. | 360/98.02 |
| 4,789,913 | 12/1988 | Gregory et al. | 360/97.02 |
| 5,097,368 | 3/1992 | Lemke et al. | 360/97.02 |
| 5,143,787 | 9/1992 | Frew et al. | 428/695 |
| 5,178,954 | 1/1993 | Norman et al. | 428/694 |
| 5,200,867 | 4/1993 | Albrecht et al. | 360/103 |
| 5,223,342 | 6/1993 | Shoji et al. | 360/97.01 |

FOREIGN PATENT DOCUMENTS 0 367 510  10/1989  European Pat. Off. .

Primary Examiner—Robert S. Tupper
Assistant Examiner—George J. Letscher
Attorney, Agent, or Firm—Fliesler, Dubb, Meyer & Lovejoy LLP

[57] ABSTRACT

A method and apparatus including a system for recirculating liquid in a controlled environment. In one aspect, a method for recirculating a liquid bearing material in an information storage apparatus is provided. The method includes providing a wick in a housing, the wick having pores of a selected size; placing the wick in contact with a storage medium; providing a quantity of liquid bearing material in the housing sufficient to maintain a desired quantity of fluid at the interface between the storage medium and an interactive element and to saturate the wick; and moving the storage medium to induce capillary action of the fluid in the wick and thereby induce condensation of the vapor phase in the pores of the wick. In a further aspect, the apparatus relates to a controlled environment within a sealed housing of an information storage device. In such an apparatus, a wick is mounted in the controlled environment, a portion of the wick being in contact with a storage medium. A liquid in the controlled environment is present in a quantity sufficient to maintain a determined quantity of fluid at the interface between the storage medium and an interactive element and to saturate the wick. A motor rotates the storage medium causing the vapor phase of the liquid to condense in the pores of the wick to maintain the determined quantity of fluid on the storage medium.

33 Claims, 3 Drawing Sheets

METHOD AND APPARATUS EMPLOYING SYSTEM FOR RECIRCULATING LIQUID IN A CONTROLLED ENVIROMENT

CROSS-REFERENCE TO RELATED APPLICATION(S)

This application is a continuation of Ser. No. 08/395,635, filed Feb. 28, 1995, now abandoned, which is a continuation of Ser. No. 07/976,216, filed Nov. 13, 1992, now abandoned.

U.S. patent application Ser. No. 07/976,198, entitled LUBRICATED DISK DRIVE, inventors William Repphun, Walter Wong, Robert E. Yates, Terrance H. West, Ronald W Wolley, Gregory Johnson, and William French filed Nov. 13, 1992 assigned to the assignee of the present invention.

INFORMATION RECORDING APPARATUS WITH A NON-NEWTONIAN LIQUID BEARING, application Ser. No. 07/810,955, inventors Lemke, et al., filed Dec. 19, 1991, which is a continuation of application Ser. No. 07/453,312, filed Dec. 20, 1989, issued as U.S. Pat. No. 5,097,368, on Mar. 17, 1992.

INFORMATION RECORDING APPARATUS WITH A LIQUID BEARING, Lemke, et al., Ser. No. 07/590,608, Oct. 17, 1988, issued as U.S. Pat. No. 5,193,046, on Mar. 9, 1993.

WET RIGID DISK DRIVE ASSEMBLY WITH A CONICAL SPINDLE BEARING, Lemke, et al., Ser. No. 587,620, filed Feb. 24, 1989.

Each of these Related Applications and Patents is assigned to the Assignee of this subject Patent and is hereby incorporated by reference.

BACKGROUND OF THE INVENTION

1. Field of the Invention

The invention relates to data storage technology, and in particular, to a data storage device utilizing storage media with a liquid lubricant interface between a storage media and a recording mechanism, such as a magnetic read/write head.

2. Description of the Related Art

The data storage industry has followed a continuing trend of decreasing the physical size of storage components, while maintaining or increasing the quantity of data stored by the component. In the field of data storage on magnetic disks, or "disk drives," for example, reductions in physical size have followed a trend of reducing the physical space occupied by the storage device, or "form factor", by approximately one-half. Thus, the length of a succeeding series of drives has equaled the width of the previous series of drives, and the width of the succeeding drive equalled approximately one-half the length of the preceding drive series. The physical height of the drives has followed a less orderly progression, beginning first with the "full height" drives, approximately 3.3" high, sized to fit into a drive bay of an IBM personal computer, then the 1.62" "half-height" drives, followed by even shorter 1" and ¾" height drives.

Disclosed in co-pending application Ser. No. 07/508,960, is a disk drive having a two and one-half inch (2½") form factor in which the length of the drive is approximately the width of a three and one-half inch (3½") drive and the width is approximately one-half of the length of a 3½" drive. The dimensions of the disk drive are: length 4 inches, width 2¾ inches, and height approximately 0.68 inch. One embodiment of the disk drive weights less than approximately six (6) ounces, and the single disk in the drive has a diameter of approximately 2.56 inches.

The drive disclosed in the '960 application incorporates an air bearing read/write head positioned over the surface of the magnetic recording disk to read data from and record data on the disk surface. Although continual contact between the transducer (typically a read/write head mounted on a slider) and the magnetic storage medium is advantageous from a magnetic perspective, such arrangement is undesirable because wear and material interactions lead to degraded system reliability and performance. Accordingly, one paramount consideration in designing magnetic recording systems is the maintenance of spacing between the head and medium.

Conventionally, air bearing sliders have been limited to a flying height on the order of 2–3 µinches. U.S. Pat. No. 5,097,368, owned by the assignee of the instant application, discloses an information recording apparatus with a non-newtonian liquid bearing between the head and the disk which allows the head to achieve a lower interface distance between the head and the disk than generally possible with air bearing slider configurations.

A major problem in the practical implementation of disk drives incorporating a liquid lubricant at the head-disk interface is the maintenance of the liquid bearing on the surface of the disk in no matter what orientation the drive may encounter during operation; that is, the liquid lubricant must be maintained on the disk in whatever attitude the drive takes with respect to the force of gravity. Obviously, the force of gravity will induce the liquid to move to the lowest point in the drive at any given time. This problem may be viewed in two contexts: where the lubricant must be applied to the surface of the disk at a location and in a manner where the surface tension of the liquid bearing is sufficient to maintain a sufficient quantity of the liquid bearing at the head disk interface; and where constant circulation of the liquid bearing to the disk surface is assured, whatever orientation the disk drive takes with respect to gravity.

In European Patent No. 0367,510, a wick structure is shown for use in applying the liquid lubricant from a reservoir at a low point in the head disk enclosure to the surface at the inner diameter of the disk surface by capillary action. Various methods are also shown therein for recirculating the liquid bearing fluid to the wick structure. However, no mention is made of the problems associated with providing the liquid onto the disk surface at the various attitudes which a disk drive may encounter.

The orientation problem is particularly acute in notebook and laptop computers wherein the possible operating attitudes which the drive may encounter are likely to be numerous and varied.

Additionally, drag is a significant problem in a lubricated disk drive. In particular, movement of the read/write head through a fluid, even a non-Newtonian fluid, causes drag on the head and the actuator arm. Such drag is not present in an air bearing disk drive since air is essentially an ideal medium. This drag must be accounted for in both terms of reducing the total drag on the head through a head design which provides the least amount of drag possible, and in terms of ensuring that the actuator and spindle motor can accommodate any drag which cannot be reduced through the head design.

Yet another problem associated with utilizing a liquid bearing in a storage device is the contamination which may be carried through the liquid to the surface of the storage media and, in many cases, may cause degradation of the data storage integrity of the drive.

Co-pending U.S. patent application Ser. No. 07/976,198, entitled LUBRICATED DISK DRIVE, inventors William Repphun, Walter Wong, and Robert E. Yates, assigned to the assignee of the present invention, discloses one method for ensuring a liquid bearing at the interface between a storage medium, such as a magnetic disk, and a storage interface, such as a read/write head. The system disclosed therein includes a wick assembly to provide bearing lubricant onto the disk surface. The wick assembly disclosed therein is generally comprised of two portions: an applicator wick assembly, and a recirculating or "transport wick" structure. The applicator wick assembly is designed to provide the bearing lubricant onto the surfaces of the storage media, while the transport wick is designed to recirculate the liquid bearing fluid, disposed throughout the interior of the head/disk assembly (HDA) during use of the drive, to the applicator wick assembly by capillary action.

In application Ser. No. 07/976,198, the applicator wick is generally coupled to the transport wick and comprises a porous, fibrous material, such as Millipore AP20 glass fiber. A wick spring induces a force of about 3 grams on the applicator wick in the direction of disk surface to ensure proper contact between the applicator wick and the surface of disk. The transport wick has a shape generally corresponding to the interior cavity of the drive's base. The transport wick may be formed of a rigid porous material, such as porous stainless steel or a porous plastic, such as 5–10 micron polyethylene or 10–20 micron polyvinylidine fluoride. Capillary action draws fluid through the transport wick as the disk surfaces moves with respect to the applicator wick assembly, and fluid is thus provided onto the disk surface.

While the transport/applicator wick scheme achieves the necessary objects of provision of fluid to the storage means/interactive means interface at various attitudes, the structure required occupies additional space within the internal, controlled environment of the disk drive. With the trend toward reduced size in disk drives, such space is at a premium.

SUMMARY OF THE INVENTION

It is therefore an object of the present invention to provide a novel method for recirculating liquid bearing fluid in a storage device utilizing a liquid bearing at the storage means/interactive means interface.

It is a further object of the present invention to provide a method for recirculating liquid in a storage device which operates irrespective of the orientation of the drive with respect to the force of gravity.

It is yet another object of the invention to minimize the additional components necessary to achieve the above objects in a controlled internal drive environment.

It is an additional object of the invention to provide a means for recirculating bearing fluid wherein any of a number of bearing fluids may be suitably utilized without modification of the recirculation means.

These and other objects of the invention are provided, in one aspect, in an information storage device. The device includes a sealed housing, the housing providing a controlled environment wherein a storage medium, means for rotating the storage medium, and an actuator assembly including at least one interactive element positioned adjacent the storage medium for reading and writing information to the storage medium are provided. Further, the storage device includes: a wick mounted in the controlled environment, a portion of the wick being in contact with the storage medium; a bearing liquid in the controlled environment in a quantity sufficient to maintain a determined quantity of fluid at the interface between the disk and the interactive element and to saturate the wick; and a spin motor for rotating the storage means to induce capillary action of the fluid in the wick wherein such capillary action compels condensation of the liquid in the porous material of the wick.

In a further aspect, the invention comprises a method for collection of a liquid bearing material in an information storage apparatus, the apparatus including a sealed housing, the housing providing a controlled environment wherein a storage medium, means for rotating the storage medium, and an actuator assembly including at least one interactive element positioned adjacent the storage medium for reading and writing information to the storage medium are provided. The method comprises:

providing a wick in the housing, the wick comprising a porous material having a specific pore size;

placing the wick in contact with the storage medium;

providing a quantity of bearing liquid in the housing sufficient to maintain a desired quantity of fluid at the interface between the disk and the interactive element, and to saturate the wick; and moving the storage means to induce capillary action of the fluid in the wick wherein such capillary action induces condensation in the porous material of the wick.

BRIEF DESCRIPTION OF THE DRAWINGS

The invention will be described with respect to the particular embodiments thereof. Other objects, features, and advantages of the invention will become apparent with reference to the specification and drawings in which.

DESCRIPTION OF THE PREFERRED EMBODIMENT

The invention is a method and apparatus for recirculating bearing fluid in a data storage device. The data storage device may comprise a disk drive utilizing magnetic storage technology, such as Winchester type disk drive technology, or, alternatively may comprise an optical storage drive utilizing an optical disk. The particular method for storing data in the data storage device is not critical to the invention, and it is contemplated by the inventor that the method for recirculating bearing fluid in a data storage device may be utilized with any device where a liquid bearing is desirable at the interface between the data storage medium and the interactive element used to read and write data to and from the data storage medium.

Figure 1:
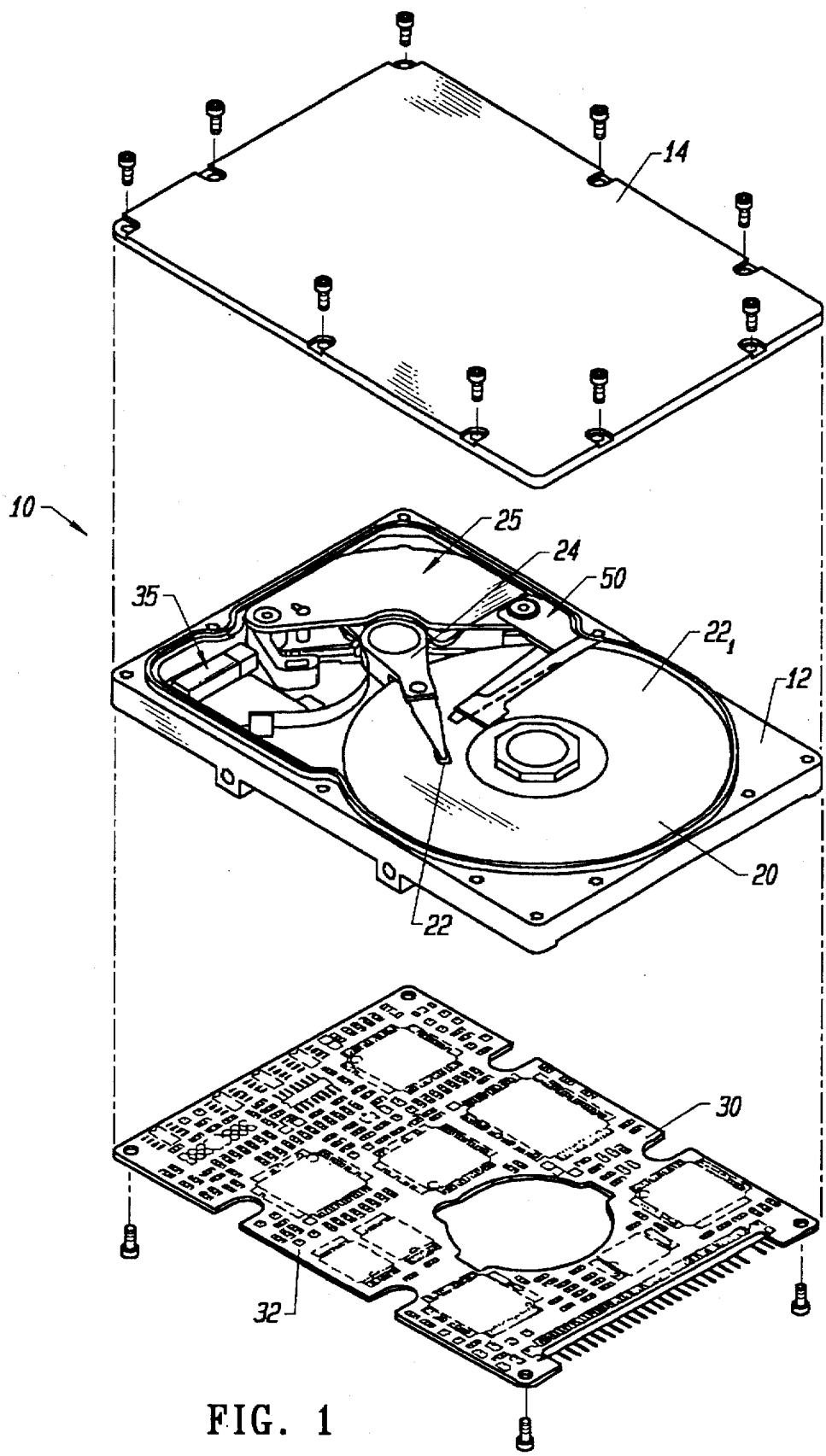
FIG. 1 is a perspective, exploded view of a disk drive for use with the present invention.
Figure 2:
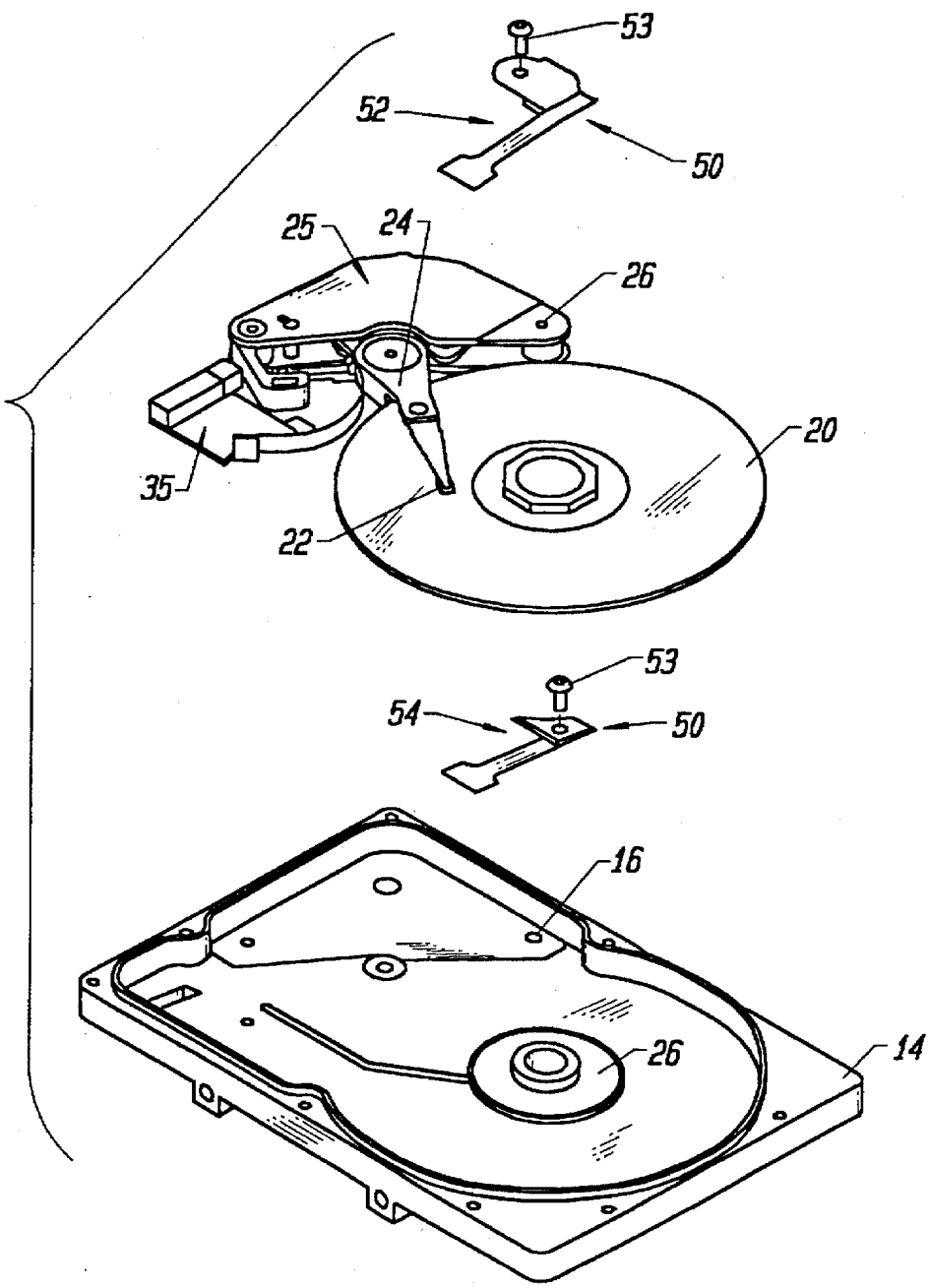
FIG. 2 is an exploded, perspective view, of a hard disk drive assembly (HDA) including the wick applicators utilized in accordance with the present invention.

FIG. 1 is a perspective view of a disk drive suitable for use with the method and apparatus for recirculating bearing fluid in a disk drive. Disk drive 10 includes a hard disk assembly comprised of a base 12 and cover 14 which engage to form a controlled environment therebetween. The controlled environment is isolated from ambient atmospheric conditions and houses a disk storage medium 20, an actuator assembly 25, and a wick assembly 50. Disk storage medium 20 includes an upper surface $20_1$ and a lower surface (not shown). Also provided is a control means 30 comprising a printed circuit board 32 having a plurality of integrated circuit components thereon which are utilized to control data storage operations in drive 10. A header assembly 35 is included to transfer control signals from printed circuit board 32 to the controlled environment defined between base 12 and cover 14. As shown in FIG. 2, a spin motor 26 is mounted in base 14 and supports disk storage medium 20 for rotation about an axis passing through the approximate center of disk 20 in a plane perpendicular thereto. Actuator assembly 25 includes an actuator arm 24 for mounting at least one interactive element 22 in a position adjacent to the surface of disk 20. As will be generally understood by those skilled in the art, at least two interactive elements 22, such as magnetic read and write heads, are generally provided, one for each surface of disk storage medium 20.

The details of the components of the disk drive 10 for use in accordance with the present invention are specifically described in co-pending application Ser. No. 07/976,198, entitled LUBRICATED DISK DRIVE. Likewise, as shown in FIG. 2, wicking assembly 50 generally comprises an upper wick assembly 52 and a lower wick assembly 54, which dispense liquid to the respective upper and lower surfaces of disk 20. Lower wicking assembly 54 may be secured into base 14 by means of a set screw 53 secured into a bore 16 in base 14. Upper wicking assembly 52 may be secured by set screw 53 provided in a bore 59 in actuator assembly 25. In accordance with the present invention, wick spring 62 provides a 3 gram load on applicator wick 65 against the surface of disk 20. In one embodiment, applicator wick 65 has a maximum width W of 0.26 inch, with the first portion having a length L of 0.75 inch, with its tip having a width W' of 0.080 inch.

Figure 3:
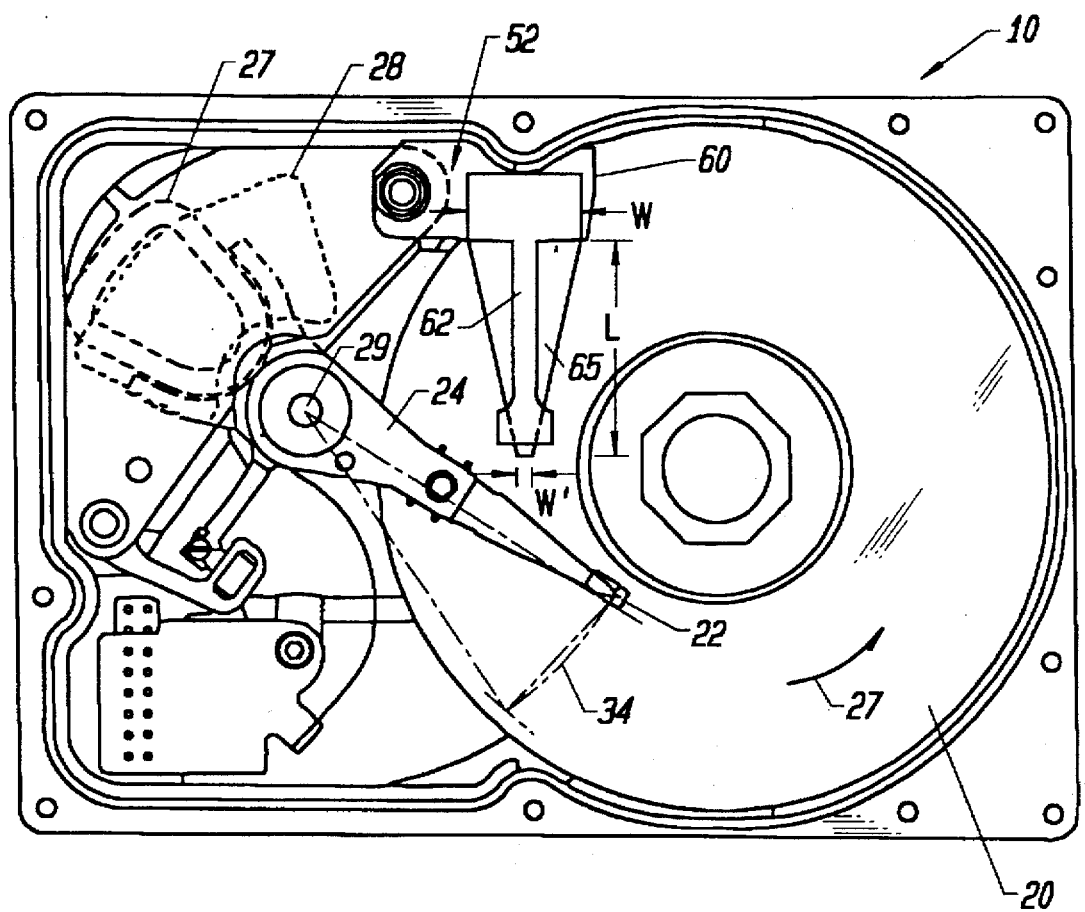
FIG. 3 is a plan view of the wicking mechanism of the present invention utilized in accordance with the disk drive of FIGS. 1 and 2.

The details of the wicking assemblies 52, 54 will be described with reference to FIG. 3. FIG. 3 is a plan view of disk drive 10. Upper wick assembly 52 includes a mounting plate 60, wick spring 62 and applicator wick 65. The operation of the disk drive involves positioning interactive elements 22 with respect to the upper and lower surfaces of disk storage medium 20. Actuator arm 24 includes a first end and a second end, the second end having a coil 27 mounted thereon which is disposed adjacent at least one permanent, bipolar magnet 28 such that a current passing through the coil in the presence of the magnetic fields generated by magnet 28 acts to rotate actuator arm 24 about a pivot point 29 to position interactive element 22 with respect to the surface of disk 20. The interactive elements associated with each side of disk 20 are in vertical, linear alignment with respect to disk 20. That is, a second interactive element (not shown) is in linear alignment with element 22 shown in FIG. 3, with the linear alignment being perpendicular to the plane of disk 20.

Although the invention will be hereafter described with reference to its application in a Winchester-type disk drive, the principles hereafter described may be utilized with other data storage formats. In a Winchester-type disk drive storage device, the interactive elements 22 comprise magnetic read/write heads, and the storage media 20 comprises a magnetic disk. It is desirable to cause head 22 to travel over the surface of disk 20 at a minimal head-disk spacing. Conventional air bearing read/write heads have achieved a head/disk spacing of approximately 2 microinches. As discussed in U.S. Pat. No. 5,097,368, assigned to the assignee of the instant application, an information recording apparatus with a non-Newtonian liquid bearing such as a perfluoropolyether or perfluoropolyether between the head and the disk allows the head to achieve a lower head/disk interface than generally possible with air bearing head configurations.

In such a system, it is necessary to maintain the liquid bearing over the entire travel path 34 of the interactive means 22. Further, as previously noted, it is particularly important that the liquid bearing be provided to the surface of the disk 20 at all attitudes which drive 10 may encounter. The present invention utilizes the Kelvin principle to control and induce recirculation of the liquid bearing fluid in the controlled environment defined between base 12 and cover 14. The movement of disk 20 with respect to applicator wick 65 drives a constant pressure reaction to induce condensation of the liquid bearing material from a vaporous phase on a portion of the wick to maintain a fluid bearing at the interface between disk 20 and interactive means 22.

For purposes of understanding the invention, the term partial pressure, p, is defined as a pressure that a gas (or vapor) in a mixture of gases would exert if it were to occupy the entire volume occupied by the mixture. The term saturation vapor pressure, $P_s$, is defined as the pressure required to maintain a vapor in mass equilibrium with a condensed vapor at a specified temperature. The saturation ratio, $p/p_s$, is the ratio of actual vapor partial pressure to the saturation vapor pressure at the temperature of the system and is generally referred to as the relative humidity RH. When the saturation ratio is greater than 1, a gas-vapor mixture is super saturated; when the ratio is equal to 1, the mixture is saturated; when less than 1, it is unsaturated.

In addition, saturation vapor pressure $(p_s)$ is defined as the equilibrium partial pressure for a plane (flat) liquid surface at a given temperature. If a liquid surface is sharply curved, such as at the surface of a small droplet, the partial pressure required to maintain equilibrium is greater than that for the flat surface. The curvature of the surface modifies slightly the attractive forces between the surface molecules, with the net result that the smaller the droplet, the easier it is for the molecules to leave the droplet surface. To prevent this evaporation, the partial pressure of vapor must be greater than the saturation vapor pressure, $p_s$.

The present invention takes advantage of this technique by utilizing the relative humidity at the surface of a liquid as a function of the form or shape of that liquid. When the surface is planar, the relative humidity is defined as 1. When the surface is convex, (RH>1) the liquid molecules at the surface are in a compression and thus desire to leave the surface so that the shape of the liquid will return to the flat, planar state. Similarly, at a concave surface, (RH<1), the liquid surface is induced to return to the planar state, as the liquid vapor molecules will condense into the concave pocket in an attempt to fill the pocket and return the liquid to a flat and equilibrium state.

In disk drive 10, applicator wick 65 is generally comprised of a Millipore AP20 material, which is a glass fiber material having pore openings with an average size of about 20 microns. At equilibrium, applicator wick 65 will be saturated with a liquid bearing material, such as Isopar L, manufactured by Exxon Corporation, which is a hydrocarbon, non-Newtonian fluid. When spin motor 59 rotates disk 20 in the direction of arrow 29, liquid material will be drawn out of applicator wick 65 by the relative motion of disk 20 and capillary action. This will cause the liquid in the pores of applicator wick 65 to take on a concave shape, inducing condensation in the pores, thus supplying liquid to the surface of disk 20 through the capillary action of wick 65. Liquid will travel from the inner diameter of disk 20 to the outer diameter of disk 20 by centrifugal force. Liquid will leave the disk surface as droplets and evaporate into vapor in the controlled environment, or form unevaporated drops which fall to the bottom of the controlled environment where the liquid will assume a flat shape to establish a saturated environment.

This reaction can be understood quantitatively as follows. The Kelvin equation defines relative humidity as follows:

$$RH = \frac{p}{p_s} = \exp\left(\frac{4\gamma M}{\rho RTd}\right) \quad \text{Eq. 1}$$

where p is the partial pressure of the liquid; $p_s$ is the saturation vapor pressure for a flat liquid surface; $\gamma$ is the liquid surface tension; M is the molecular weight of the liquid; $\rho$ is the liquid density; R is the gas constant; T is the temperature; and d is the diameter of the surface (where positive is convex, negative is concave, and infinity is flat).

This equation can be simplified by assuming that for a given saturation vapor pressure $p_s$, the values of $\gamma$, M, $\rho$, R, and T are constant. Based on this assumption, the equation simplifies to:

$$RH = \exp\left(\frac{K}{d}\right) \quad \text{Eq. 2}$$

where K is some positive constant. It is further known that when d is equal to infinity (a flat surface) the relative humidity is: exp (0)=1 (RH=1). When d is positive (a drop), RH is exp (positive integer)=(RH>1) and therefore greater than 1. When d is negative (a pore), RH<1. As set forth above, when RH is less than 1, there is a gradient that drives the condensation in the wick surface. Conversely when RH is greater than 1, there is a gradient that drier evaporation of the drops.

Thus, for the saturated applicator wick 65 at the beginning of the deposition process, a fluid film liquid bearing at the surface of the head/disk interface will be maintained since the capillary action of the movement of disk 20 with respect to interactive means 22 will continue driving the condensation of liquid into applicator wick 65.

A unique feature of this technique is that the applicator wick 65 is not required to be in contact with free liquid in the drive to deposit liquid on the surface of disk 20. This allows drive 10 to be positioned in any attitude with respect to the force of gravity while maintaining a fluid bearing surface on surfaces of disk 20. In addition, particulate contamination will be trapped in the liquid sump area (the lower portion of the controlled environment) and will not be able to reach the disk to damage it. In particular, particulate contamination will not be carried by the evaporation of the liquid bearing fluid in the contained system to condense the wick surface. Therefore, the particulate contamination is not able to reach or damage disk 20. Traditional wicking techniques requires that one end of the wick must be in contact with the free liquid in the drive. This traditional lift height was limited by how high the liquid would lift by the forces of surface tension. In the recirculation method of the present invention, these particular limitations of the prior art are overcome.

A test utilizing the recirculation system of the present invention, a wick structure and disk drive in accordance with the present invention has been run a continuously for a period of six months without resulting wear on the interactive read/write heads, indicating a sufficient quantity of bearing fluid at the head/disk interface. In addition, in a case where disk 20 was retained at a fixed position, applicator wick 65 retained sufficient liquid bearing fluid to allow for restarting the recirculation action by capillary retention of the fluid.

The various objects and advantages of the present invention will be apparent to those skilled in the art. Numerous modifications to the drive of the present invention will be obvious to those skilled in the art. As will be generally understood, use of the recirculation system of the present invention is not limited to use with a magnetic storage type disk drive. For example, in optical media, it may be necessary to provide the optical interface head at a distance which is as close as possible to the storage media. Such modifications are intended to be within the scope of the invention as disclosed in the instant specification, the drawings, and the following claims.

I claim:

1. An information storage device including a sealed housing, the housing providing a centered environment wherein a storage medium, means for rotating the storage medium, and an actuator assembly including at least one interactive element positioned adjacent the storage medium for reading and writing information to the storage medium are provided, comprising:

a bearing fluid existing in said sealed housing as a liquid and a vapor in equilibrium in a quantity sufficient to maintain a determined quantity of the liquid at an interface between the storage medium and the interactive element and to saturate the wick:

a wick formed from a porous material mounted in the controlled environment spaced from a reservoir of said liquid within the information storage device, a portion of the wick being in contact with the storage medium at a contact point; and in a quantity sufficient to maintain a determined quantity of the liquid at an interface between the storage medium and the interactive element and to saturate the wick;]

wherein said liquid is drawn from said wick onto the storage medium by rotation of the storage medium relative to said wick; and wherein said wick is capable of attracting said vapor from said rotation of said storage medium such that said vapor condenses into said liquid on said wick to replenish a supply of said liquid drawn from said wick.

2. The information storage device of claim 1 wherein the storage medium comprises a magnetic disk, and the interactive element comprises at least one read/write head.

3. The information storage device of claim 2 wherein the bearing fluid comprises non-Newtonian fluid bearing.

4. The information storage device of claim 3 wherein the bearing fluid is a perfluoropolyether.

5. The information storage device of claim 3 wherein the bag fluid is a hydrocarbon.

6. The information storage device of claim 2 wherein the wick material is a glass fiber material having a pore size of about 20 microns.

7. The information storage device of claim 1 wherein the storage medium comprises an optical disk.

8. The information storage device of claim 1 wherein said wick comprises pores capable of holding said liquid, a surface of said liquid having a concave shape as liquid is drawn from said wick, said vapor bring attracted to said concave-shaped surface of said liquid.

9. A method for collection of a liquid bearing material in an information storage apparatus, the apparatus including a sealed housing, the housing providing a controlled environment wherein a storage medium, means for rotating the storage medium, and an actuator assembly including at least one interactive element positioned adjacent the storage medium for reading and writing information to the storage medium are provided, comprising:

providing a quantity of bearing fluid existing as a liquid and a vapor in equilibrium in the housing sufficient to maintain a desired quantity of the liquid at an interface between the storage medium and the interactive element, and to saturate the environment and the wick;

providing a wick in the housing spaced from a reservoir of said liquid within the housing, the wick comprising a porous material;

placing the wick in contact with the storage medium at a contact point reservoir of said liquid within the housing;

moving the storage means to induce transfer of the liquid from the wick to the storage means and to induce capillary action of the liquid through the wick toward the wick contact point; and attracting said vapor onto said wick from said movement of said storage means to condense into said liquid.

10. The method of claim 9 wherein the method is performed in an information storage device.

11. The method of claim 10 wherein the information storage device is a magnetic storage device, and the liquid utilized is a non-Newtonian liquid bearing.

12. The method of claim 11 wherein the liquid is a fluoropolyether.

13. The method of claim 11 wherein the liquid is a hydrocarbon.

14. A disk drive, comprising:

a housing controlled environment isolated from ambient atmospheric conditions;

a storage medium mounted within the housing;

an interactive element provided adjacent the storage medium;

a fluid bearing provided within the housing as a liquid and a vapor in equilibrium;

a porous wick mounted in the housing spaced from a reservoir of said liquid within the disk drive, and with a portion of the wick being in contact with the storage medium at a wick contact point, said wick capable of attracting vapor to condense thereon upon rotation of said storage medium relative to said wick; and wherein said liquid condensed on liquid wick replenishes a supply of liquid on said storage medium.

15. The disk drive of claim 14 wherein the storage medium comprises a magnetic disk, and the interactive element comprises at least one read/write head.

16. The disk drive of claim 15 wherein the fluid bearing comprises a non-Newtonian fluid bearing.

17. The disk drive of claim 16 wherein the fluid bearing is a fluoropolyether.

18. The disk drive of claim 17 wherein the fluid bearing is a hydrocarbon.

19. The disk drive of claim 15 wherein the wick material is a glass fiber material having a pore size of about 20 microns.

20. The disk drive of claim 15 wherein the wick material is a glass fiber material having a pore size of about 20 microns.

21. The disk drive of claim 17 wherein the storage medium comprises an optical disk.

22. An information storage device including a sealed housing, the housing providing a controlled environment wherein a storage medium, means for rotating the storage medium, and an actuator assembly including at least one interactive element, positioned adjacent the storage medium for reading information from and writing information to the storage medium are provided, comprising:

a bearing fluid in the controlled environment as a liquid and vapor in equilibrium, in a quantity sufficient to maintain a determined quantity of said liquid at an interface between the storage medium and the interactive element; and a porous wick material mounted in the controlled environment and having pores saturated with bearing fluid, said wick material spaced away from a reservoir of said liquid within the storage device, and a portion of the wick material being in contact with the storage medium;

wherein, during rotation of the medium, bearing liquid at the interface is deposited on the storage medium and is replenished principally through condensation of the vapor phase onto the wick material and transport of condensed liquid to the interface, said pores capable of holding said liquid such that a surface of said liquid in said poxes has a concave shape when said liquid is drawn out of said wick, said vapor being attracted to said concave-shaped surface.

23. The information storage device of claim 22 wherein the storage medium comprises a magnetic disk, and the interactive element comprises at least one read/write head.

24. The information storage device of claim 23 wherein the bearing liquid comprises a non-Newtonian fluid bearing.

25. The information storage device of claim 23 wherein the storage medium comprises an optical disk.

26. The information storage device of claim 23 wherein the wick material is a glass fiber material having a pore size of about 20 microns.

27. The information storage device of claim 22 wherein the storage medium comprises an optical disk.

28. The information storage device of claim 22 wherein the means for moving comprises a spindle motor.

29. A disk drive, comprising:

a housing defining a controlled environment isolated from the ambient atmosphere;

a storage medium mounted within the housing;

a motor for rotating the medium;

an interactive element provided adjacent the storage medium;

a fluid bearing within said housing, the fluid bearing comprising liquid and vapor in equilibrium; and a porous wick mounted in the housing, said wick being spaced from a reservoir of said liquid within said housing, with a portion of the wick being in contact with the storage medium, rotation of said storage medium being capable of drawing said liquid onto said storage medium through said wick, said wick including pores capable of holding said liquid such that a surface of said liquid in said pores has a concave shape when said liquid is drawn out of said wick, said vapor being attracted to said concave-shaped surface.

30. The disk drive of claim 29 wherein the storage medium comprises a magnetic disk, and the interactive element comprises at least one read/write head.

31. The disk drive of claim 30 wherein the bearing liquid comprises a non-Newtonian fluid bearing.

32. The disk drive of claim 31 wherein the liquid bearing material is a hydrocarbon.

33. The disk drive of claim 29 wherein the storage medium comprises an optical disk.

* * * * *

UNITED STATES PATENT AND TRADEMARK OFFICE
CERTIFICATE OF CORRECTION

PATENT NO. : 5,680,273
DATED : Oct. 21, 1997
INVENTOR(S) : Walter Wong

It is certified that error appears in the above-identified patent and that said Letters Patent is hereby corrected as shown below:

Col. 8, line 10: "centered" should be "controlled"

Col. 8, lines 26-29: "in a quantity sufficient to maintain a determined quantity of the liquid at an interface between the storage medium and the interactive element and to saturate the wick;]" should be deleted Col. 8, line 42: after "comprises" insert "non-Newtonian"

Col. 8, line 46: "bag" should be "bearing"

Col. 9, line 7: after "point" insert "spaced from a"

Col. 9, line 26: after "housing" insert "defining a"

Col. 9, line 40: "liquid" should be "said"

UNITED STATES PATENT AND TRADEMARK OFFICE
CERTIFICATE OF CORRECTION

PATENT NO.  : 5,680,273
DATED       : Oct. 21, 1997
INVENTOR(S) : Walter Wong

It is certified that error appears in the above-identified patent and that said Letters Patent is hereby corrected as shown below:

Col. 9, line 45:   "beating" should be "bearing"

Col. 9, line 49:   "17" should be "16"

Col. 9, line 57:   "17" should be "14"

Col. 10, line 18:  "poxes" should be "pores"

Signed and Sealed this

Sixteenth Day of March, 1999

Attest:

Q. TODD DICKINSON

Attesting Officer

Acting Commissioner of Patents and Trademarks